United States Patent Office 2,715,325
Patented Aug. 16, 1955

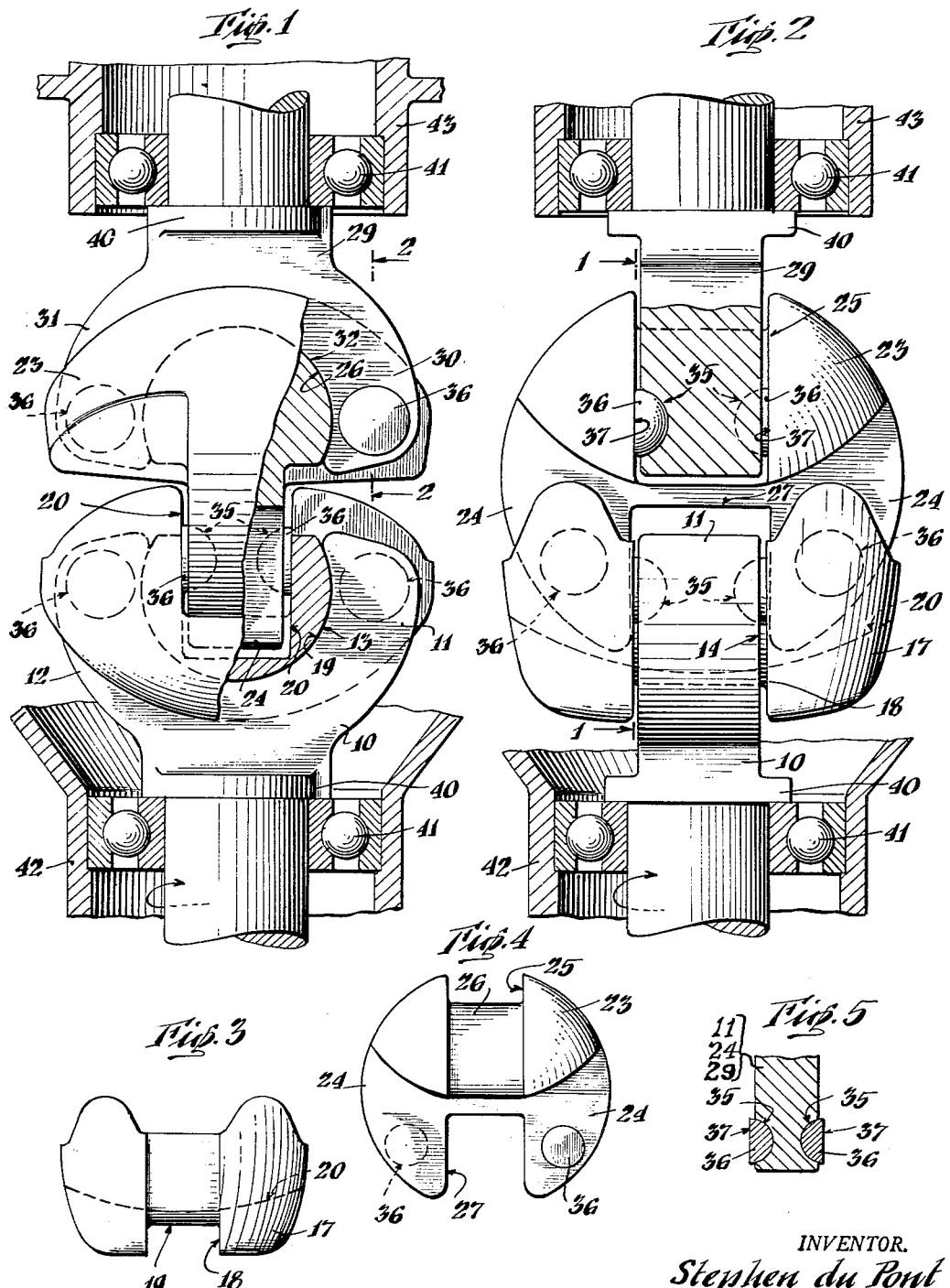

2,715,325

CONSTANT VELOCITY UNIVERSAL JOINT

Stephen Du Pont, Westport, Conn., assignor to Doman Helicopters, Inc., Danbury, Conn., a corporation of Delaware Application May 13, 1952, Serial No. 287,478

6 Claims. (Cl. 64—21)

The invention relates to an improvement in a constant velocity universal joint of the type shown in the Fenaille Patent 2,088,849. The driving parts of the joint are flexible to some degree with the result that under torque loads these parts are subject to deflection so that surface to surface contact is probably not secured. In any event galling of the driving surfaces results which eventually leads to joint failure.

It is an object of the invention to construct a constant velocity universal joint of the sliding surface type with universally adjusting driving faces at least for the forks thereof.

Another object of the invention is to construct a constant velocity universal joint in which the driving surfaces or side walls are in flat contact at all times.

Another object is to construct a constant velocity universal joint of the sliding surface type in which means are provided to prevent the driving surfaces of the joint from being galled.

Another object is to provide a constant velocity universal joint of the sliding surface type which compensates or adjusts itself for deflection which occurs in the parts of the joint.

Other objects of the invention will be more apparent from the following description when taken in connection with the accompanying drawings illustrating a preferred embodiment thereof in which:

Figure 1 is an elevation of the joint with a portion thereof in section taken on line 1—1 of Figure 2;

Figure 2 is a side elevation of the universal joint with a portion in section through a spheroidal segment.

Figure 3 is a side elevation of one of the intermediate members;

Figure 4 is a side elevation of the other intermediate member; and

Figure 5 is a partial section of a driving fork and the flange means for a two directional universal joint.

A constant velocity universal joint of the sliding surface type includes a driving fork 10 having a pair of arms 11 and 12. A concave circular surface 13 is provided between the arms or on the inner faces of the arms. The arms 11 and 12 have driving faces or side walls 14 formed by the sides of the arms which faces are substantially perpendicular to the circular direction of the torque force transmitted through the joint. The joint particularly illustrated is a unidirectional joint such as may be used in the drive shaft for a rotor head of a helicopter.

A driving intermediate member 17 has a fork groove 18 in the surface thereof, the bottom 19 of which is a convex circular surface for engagement with the concave circular inner surface 13 of the driving fork 10. The side walls of the groove 18 are substantially perpendicular to the circular torque force applied thereto by the driving fork 10. The width of the fork groove 18 is slightly greater, such as about six to fifteen thousandths of an inch, than the width of the fork arms. The intermediate driving member 17 has a flange means groove 20 which extends at right angles with respect to the fork groove 18. The side faces or walls of the flange means groove form driving side walls or for a unidirectional joint the opposite side wall of opposite ends of the flange means groove form driving side walls. The flange means groove side walls are substantially perpendicular to the circular direction of the torque force transmitted by the joint. In the preferred construction the flange means groove is a little wider than the flange means to be described.

A driven intermediate member 23 carries a flange means 24 which is slidably received in the flange means groove 20 of the driving intermediate member. The flange means may have a slot 27 centrally thereof so that the flange means is fork like. The driven intermediate member has a fork groove 25 which extends at right angles to the flange means 24. The bottom 26 of the fork groove is convex circular and the side walls thereof are substantially perpendicular to the circular torque force. The fork groove 25 has a width a little greater than the width of the driven fork arms, which will be described.

A driven fork 29 has a pair of spaced arms 30 and 31. A concave circular inner surface 32 is provided between the arms or on the inner face thereof for engagement with the convex circular surface 26 at the bottom of the fork groove 25. The side walls of the driven fork arms 30 and 31 are substantially perpendicular to the circular direction of the torque force transmitted by the joint.

The constant velocity universal joint may be a two directional joint if desired in which case both side walls of each arm of both forks and both side walls of the flange means 20 at both ends thereof constitute driving surfaces or side walls as well as the cooperating side walls of the respective grooves which receive the arms and the flange means. For a unidirectional joint, as particularly illustrated in Figures 1 through 4, one side wall of one arm 11 and 30 and the opposite side wall of the other arm 12 and 31 constitute driving side walls as well as the cooperating side walls of the respective groove in which the fork arm is received. Likewise one side wall or face of one end of the flange means 24 and the opposite side wall or face at the other end of the flange means 24 constitute driving walls or faces for a unidirectional joint as well as each cooperating side wall or face of the flange groove 20.

Each driving face or side wall of the forks 10 and 29 adjacent the end of each arm thereof is provided with a spheroidal socket 35. For a unidirectional joint, the driving side wall of one arm of each fork is on the opposite side wall with respect to the other arm. The driving side walls are those which carry or transmit the torque force. In each socket there is received a spheroidal segment 36 having a flat face 37 which projects above the side wall of the arm about five to ten thousandths of an inch and contacts with the adjacent side wall of its respective fork groove 18 and 25. The forks alone may be provided with the spheroidal sockets and spheroidal segments; however, for best results the driving side walls or faces of the flange 24 also carry a spheroidal socket 35 adjacent the ends thereof in each of which is received a spheroidal segment 36. For a unidirectional joint one wall or face at one end of the flange 20 carries such socket and segment and the other end of the flange on the opposite side wall or face thereof carries a socket and segment. In a unidirectional joint, each fork therefore has two sockets and segments and if sockets and segments are provided in the flange, it carries two sockets and segments for a total of six sockets and segments.

Driving contact between the driving fork 10 or the arms thereof and the side wall of the fork groove 18 is made through the flat face 37 of the spheroidal segment 36. No matter what deflections of arms and groove which may and do occur under the torque forces, the spheroidal segment adjusts itself thereto so that the flat face 37 is always in flat surface contact with the side wall of the fork groove. Likewise the spheroidal segments carried by the connecting flange means 24 adjust themselves no matter what deflections occur in the flange means and the side wall of the flange means groove 20 so that surface contact is always maintained between the flat face of the segment and the cooperating driving side wall of the flange groove. The segment carried by each arm of the driven fork 29 likewise adjusts itself to any deflections occurring in the arms of the fork and the side walls of the fork groove 25 to maintain flat surface contact therebetween. The driving side walls carrying a spheroidal segment have a sufficient dimension to carry a substantial sized segment so that the torque forces transmitted therethrough are not distributed over the flat face of the segment of small area.

For a two directional universal joint spheroidal sockets and spheroidal segments are provided on all driving side walls or faces of the forks and flange means which means that each segment has a like segment on opposite walls or faces of each arm, as shown particularly in Figure 5. Similarly opposite faces of each end of the flange means 24 carry a socket 35 and a segment 36 in the socket. The construction of Figure 5 would be duplicated for each spheroidal segment shown in the constructions of Figures 1 through 4. In a two directional universal joint, each fork is provided with four sockets and segments and if the flange is provided with sockets and segments it has four also for a total of twelve sockets and segments for the joint.

It is clear that the spheroidal sockets and segments may be carried by the driving side walls of the fork grooves and flange means groove rather than by the fork arms and flange means. It would be, however, a difficult manufacturing operation to so plate the sockets whereas it is a relatively simple operation to provide them as shown in the fork arms and the flange means.

The parts of the universal joint are held in axial position in any suitable manner, that illustrated including an abutment 40 carried by the driving fork 10 and the driven fork 29 and a bearing 41 carried by the surrounding supporting frame or structure. For a helicopter the supporting structure may be a mast 42 for the driving shaft for a rotor head and the supporting structure for the other fork of the joint would be a part 43 of the rotor head for the helicopter which part is mounted upon the mast by a universal joint which is concentric with the constant velocity universal joint.

Although the fork 10 has been described as a driving fork, the fork 29 may be the driving fork in which case its direction of rotation is reversed from its direction of rotation when it serves as a driven fork. Such reverse direction of rotation would require no alteration of the location of the spheroidal sockets and their segments. To have the same direction of rotation the spheroidal segments are merely relocated on the opposite side wall of each arm and flange means.

The invention is presented to fill a need for improvements in a constant velocity universal joint. It is understood that various modifications in structure, as well as changes in mode of operation, assembly, and manner of use, may and often do occur to those skilled in the art, especially after benefiting from the teachings of an invention. Hence, it will be understood that this disclosure is illustrative of preferred means of embodying the invention in useful form by explaining the construction, operation and advantages thereof.

What is claimed is:

1. A constant velocity universal joint including a pair of spaced forks each having a pair of arms with a concave circular inner surface, each arm having side walls which are substantially perpendicular to the circular direction of the torque force transmitted thereby and at least one side wall being a driving side wall, connecting means between the forks including a pair of intermediate members each having a fork groove therein the side walls of which are substantially perpendicular to the circular direction of torque force and the side wall adjacent a driving side wall of a fork arm being a driving side wall, the bottom surface of each fork groove being convex circular for engagement with the concave circular inner surface of a fork, each fork groove being a little wider than the width of the fork arms and receiving a fork therein, a connecting flange means carried by one of the intermediate members and extending at right angles to the fork groove and having driving side walls substantially perpendicular to the circular direction of torque force, the other intermediate member having a flange means groove extending at right angles to its fork groove and the side walls of which are substantially perpendicular to the circular direction of torque force and receiving the connecting flange means, spaced spheroidal sockets in the driving side walls at least for the forks, and a spheroidal segment in each socket projecting beyond the driving wall and having a flat face engaging the adjacent side wall.

2. A constant velocity universal joint as in claim 1 including spaced spheroidal sockets for the driving walls of the connecting flange means and adjacent to the ends thereof, and a spheroidal segment in each socket projecting above the side wall and having a flat face for engagement with the adjacent side wall.

3. A constant velocity universal joint including a pair of spaced forks each having a pair of arms with a concave circular inner surface, each arm having side walls which are substantially perpendicular to the circular direction of the torque force transmitted thereby and at least one side wall being a driving side wall, connecting means between the forks including a pair of intermediate members each having a fork groove therein the side walls of which are substantially perpendicular to the circular direction of torque force and the side wall adjacent a driving side wall of a fork arm being a driving side wall, the bottom surface of each fork groove being convex circular for engagement with the concave circular inner surface of a fork, each fork groove being a little wider than the width of the fork arms and receiving a fork therein, a connecting flange means carried by one of the intermediate members and extending at right angles to the fork groove and having driving side walls substantially perpendicular to the circular direction of torque force, the other intermediate member having a flange means groove extending at right angles to its fork groove and the side walls of which are substantially perpendicular to the circular direction of torque force and receiving the connecting flange means, a spheroidal socket in the driving side walls at least of the forks and adjacent the end of each arm of the fork, and a spheroidal segment in each socket projecting beyond the driving side wall and having a flat face engaging the side wall of its respective groove.

4. A constant velocity universal joint as in claim 3 including spaced spheroidal sockets for the driving side walls of the connecting flange means, and a spheroidal segment in each socket of the flange means projecting above the side wall of the flange means and having a flat face for engagement with the adjacent side wall of the flange means groove.

5. A unidirectional constant velocity universal joint including a pair of spaced forks each having a pair of arms with a concave circular inner surface, each arm having one driving side wall on the opposite side wall with respect to the other arm, the side walls being substantially perpendicular to the circular direction of the torque force transmitted thereby, connecting means between the forks including a pair of intermediate members each having a fork groove therein the side walls of which are substantially perpendicular to the circular direction of torque force and the bottom surface of each fork groove being convex circular for engagement with the concave circular inner surface of a fork, each fork groove being a little wider than the width of the fork arms and receiving a fork therein, a connecting flange means carried by one of the intermediate members and extending at right angles to the fork groove and having driving side walls on opposite sides thereof substantially perpendicular to the circular direction of torque force, the other intermediate member having a flange means groove extending at right angles to its fork groove and the side walls of which are substantially perpendicular to the circular direction of torque force and receiving the connecting flange means, a spheroidal socket in the driving side wall of each arm of the forks and adjacent the end of each arm, and a spheroidal segment in each socket projecting beyond the driving side wall and having a flat face engaging the side wall of its respective groove.

6. A unidirectional constant velocity universal joint as in claim 5 including spaced spheroidal sockets in the opposite driving side walls of the connecting flange means, and a spheroidal segment in each socket of the flange means projecting above the side wall of the flange means and having a flat face for engagement with the adjacent side wall of the flange means groove.

References Cited in the file of this patent

UNITED STATES PATENTS

| | | |
|---|---|---|
| 1,300,541 | Wolffgram | Apr. 15, 1919 |
| 2,088,849 | Fenaille | Aug. 3, 1937 |